Oct. 14, 1958   J. L. MOSSEY   2,856,034

FLUID MOTOR

Filed Oct. 21, 1955

INVENTOR.
JOSEPH L. MOSSEY.
BY John A. Young
ATTORNEY.

United States Patent Office 2,856,034
Patented Oct. 14, 1958

2,856,034
FLUID MOTOR

Joseph L. Mossey, South Bend, Ind., assignor to Bendix Aviation Corporation, South Bend, Ind., a corporation of Delaware Application October 21, 1955, Serial No. 542,049

5 Claims. (Cl. 188—73)

This invention relates to a fluid motor in which the pressure responsive element thereof consists almost entirely of friction material with a lamination or covering of fluid-impervious material.

The present invention is designed for use in a combination "disk" and "shoe" friction unit, such as that fully described and claimed in copending application U. S. Serial No. 369,197, filed July 20, 1953, although it is by no means limited to this application. The "disk" elements in the selected illustration of the invention, are laterally actuated and may include friction surfaces at the remote ends of a pair of oppositely-acting pistons.

It was first proposed to secure friction material to a separate piston but this presented several design problems. For one thing, it was necessary that the piston be of sufficient thickness to cover a sealing ring and provide sufficient bearing within the cylinder. This requirement often dictated a reduced thickness of the friction material with the result that a shorter wear-life of the disk element was obtained. For replacement purposes, it was necessary to re-line or re-bond the outer faces of the pistons with new segments of lining for service usage.

It was also discovered that the metallic piston, which served as a carrier for the friction material, also acted as an efficient conductor of heat to the fluid in the cylinder chamber and this resulted in raising the temperature of the hydraulic fluid, sometimes to the boiling point or vaporization point.

The present invention proposes that the piston consist entirely of friction material encased with a lamination of hydraulic-fluid-impervious material. With this construction, it is proposed that greater thicknesses of lining material may be provided to prolong the wear-life of the disk element.

It is a further object of the invention to insulate the hydraulic fluid from the heat developed during a brake application in order to minimize fluid boiling or vaporization. The friction material is less conductive than metal so that a piston made up almost entirely of friction material would serve as a heat barrier to protect the fluid in the cylinder chamber.

It is further proposed to replace the entire disk element when it is worn in order to simplify servicing of the unit. The piston, which consists almost entirely of friction material, will be completely replace rather than re-lining or re-bonding a metallic piston.

Other objects and features of the invention will become apparent from a consideration of the following description which proceeds with reference to the accompanying drawings, wherein.

Figure 1:
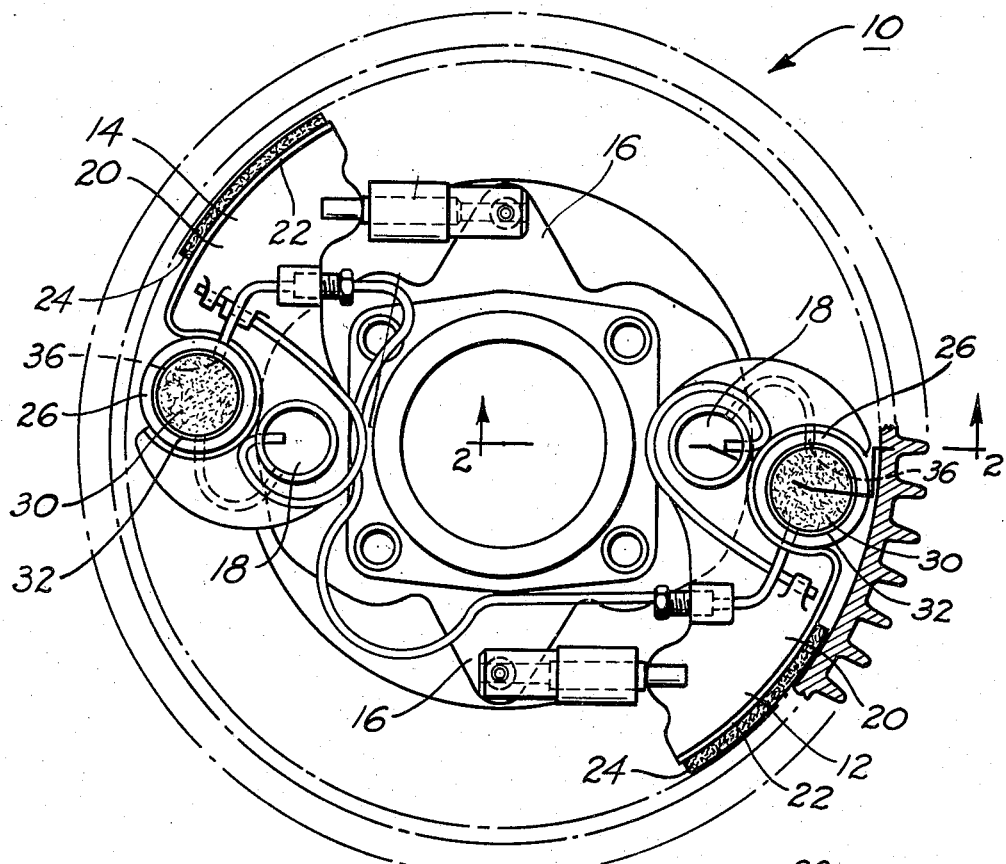
Figure 1 is a plan view of a kinetic-energy-absorbing device having friction units with the invention provided therein.
Figure 3:
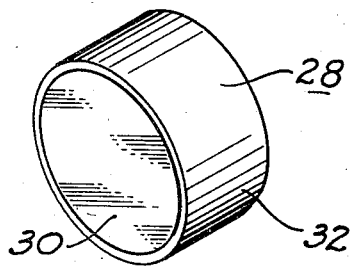
Figure 3 is an isometric detail view of the friction material piston.
Figure 2:
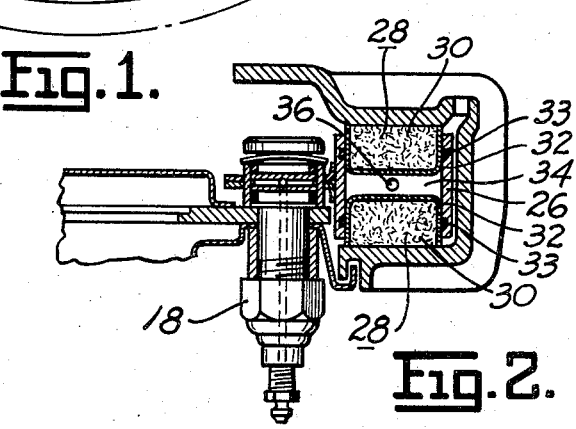
Figure 2 is a section view taken on the line 2—2 of Figure 1.

Kinetic-energy-absorbing device, designated generally by reference numeral 10 in Figure 1, includes two identical friction units 12 and 14 which are mounted at opposite sides of a torque plate 16 on anchors 18. Each friction unit includes a web 20, a rim 22 having friction material lining 24, and a cylinder 26 which is radially intermediate the anchor 18 and the arcuate lined rim 22. Reciprocably received in the cylinder 26 are two oppositely acting pistons 28 (Figure 2). Each piston consists almost entirely of friction material 30 which has a surrounding casing 32 of hydraulic-fluid-impervious material. This casing may consist of a metallic shell, or, if preferred, a lamination of any suitable fluid-impervious material such as resin or the like.

Between the pistons 28 is a fluid chamber 34. An inlet port 36 communicates with a fluid chamber 34.

From a consideration of Figure 2, it will be noted that the fluid-impervious shell of casing 32 surrounds the friction lining piston 30 and contacts the wall of the cylinder bore between O-ring seal 33 and the center of the cylinder. If this portion of the reciprocable member were made up of a solid metallic portion, it can easily be seen that this would reduce the available friction material contributing to the wear-life of the article.

With the construction shown, however, all of the volume previously occupied by a separate piston is now occupied by friction material to thus increase the available material determining the wear-life of the article. With the present invention, the friction material piston is completely replaced when it becomes worn, thus there is obviated such problems as relining and refinishing of old pistons.

Although this invention has been described in connection with but a single example embodiment, it will be apparent to those skilled in the art that numerous modifications and revisions of the general principles are possible. Accordingly, it is not my intention to limit the scope of the invention to the specific embodiment shown, but I intend rather to include within the purview of the following claims such modifications and revisions as are reasonably expected from those skilled in the art.

I claim:

1. In a fluid motor, a cylinder bore having an annular groove in the wall thereof, an O-ring seal positioned in said annular groove, a cylindrical segment of friction lining material which is receivable in said cylinder bore, a fluid impervious casing which surrounds said segment within said cylinder bore and provides the sole bearing surface in slidable engagement with said cylinder bore, said casing having wearable sides which are coextensive with the exposed braking surface of said lining to erode concurrently with the lining material at the engageable surface thereof and an inlet port which communicates with said cylinder bore to develop fluid pressure in said cylinder bore produced displacement of said lining segment.

2. In a fluid motor, a cylinder bore, two oppositely-acting cup-shaped fluid-impervious shells of thin-walled construction slidably received in said cylinder bore, and a cylindrical segment of friction material received in each of said shells and presenting oppositely-facing exposed friction surfaces, said segments being combined with the fluid motor to serve as the pistons therefor, said shells being coextensive with the friction material received therein so that the ends of said shell are wearable along with said friction material, a fluid chamber between said shells, and an inlet port through which fluid pressure is communicated to said fluid chamber.

3. In a fluid motor, a cylinder, two oppositely-acting pistons formed of friction material, said pistons being reciprocably received in said cylinder, a hydraulic-fluid-impervious lamination on the portion of said friction material exposed to the hydraulic fluid in said cylinder, said lamination being sufficiently reduced in thickness and extending outwardly to the braking surface to be wearable concurrently with the friction material at the engageable surface thereof and a chamber between said pistons where fluid pressure is developed to spread said pistons apart.

4. In a fluid motor, a reciprocable piston formed of friction material, and a hydraulic-fluid-impervious covering on the portion of said friction material exposed to the hydraulic fluid in said fluid motor, said covering also being coextensive with the friction material and of sufficiently reduced thickness to be wearable concurrently with the friction material at the engageable surface thereof.

5. In a fluid motor, a cylinder and two oppositely-acting reciprocable pistons slidably received in said cylinder bore and consisting of segments of friction material, and a relatively thin fluid-impervious covering formed over the outer surface of each piston in the regions of the piston exposed to hydraulic fluid in the pressure chamber of said cylinder bore, said covering being of sufficiently thin walled construction and surrounding the length of said segments to be wearable concurrently with the segments at the oppositely-facing engageable surfaces thereof.

References Cited in the file of this patent

UNITED STATES PATENTS

| 1,557,669 | De France | Oct. 20, 1925 |
| 2,392,970 | Bricker | Jan. 15, 1946 |
| 2,445,061 | Goepfrich | July 13, 1948 |
| 2,629,474 | Weiland | Feb. 24, 1953 |

FOREIGN PATENTS

| 818,889 | Germany | July 8, 1949 |

UNITED STATES PATENT OFFICE
CERTIFICATE OF CORRECTION

Patent No. 2,856,034 October 14, 1958

Joseph L. Mossey

It is hereby certified that error appears in the printed specification of the above numbered patent requiring correction and that the said Letters Patent should read as corrected below.

Column 1, line 59, for "replace" read -- replaced --; column 2, line 54, for "produced" read -- producing --.

Signed and sealed this 17th day of March 1959.

(SEAL)
Attest:

KARL H. AXLINE
Attesting Officer

ROBERT C. WATSON
Commissioner of Patents